United States Patent
Maruyama et al.

(10) Patent No.: US 6,192,951 B1
(45) Date of Patent: Feb. 27, 2001

(54) HEAVY-DUTY PNEUMATIC RADIAL TIRE WITH TRANSPONDER BURIED IN BEAD FILLER

(75) Inventors: Hirokatsu Maruyama; Kazuhiro Shimura, both of Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 09/409,442

(22) Filed: Sep. 30, 1999

(30) Foreign Application Priority Data

Oct. 1, 1998 (JP) .................................. 10-280224

(51) Int. Cl.[7] ........................ B60C 15/00; B60C 19/00; H04B 1/59
(52) U.S. Cl. ........................ 152/152.1; 152/539
(58) Field of Search ................ 152/152.1, 541, 152/539

(56) References Cited

U.S. PATENT DOCUMENTS 4,911,217 * 3/1990 Dunn et al. ................ 152/152.1
5,181,975 * 1/1993 Pollack et al. ................ 152/152.1

* cited by examiner

Primary Examiner—Adrienne C. Johnstone
(74) Attorney, Agent, or Firm—Arent Fox Kintner Plotkin & Kahn, PLLC

(57) ABSTRACT

A heavy-duty pneumatic radial tire is disclosed, which comprises a bead filler disposed on an outer periphery of an annular bead core; a carcass layer formed by arraying a plurality of steel cords in a tire radial direction, an end part thereof being turned up from the inside of the tire to the outside around the bead core; a steel reinforcing material wrapping around the bead core with the carcass layer interposed, and a bar-shaped transponder buried in an area separated from metallic components of a bead section in the bead filler so as to set a longitudinal direction thereof in a tire circumferential direction, the area being closer to the bead core than a turned-up end of the carcass layer in a turned-up side of the carcass layer, and closer to the bead core than an inner wrapping end of the steel reinforcing material in a main body side of the carcass layer.

4 Claims, 2 Drawing Sheets

HEAVY-DUTY PNEUMATIC RADIAL TIRE WITH TRANSPONDER BURIED IN BEAD FILLER

BACKGROUND OF THE INVENTION

The present invention relates to a heavy-duty pneumatic radial tire with a transponder buried in a bead section. More specifically, the invention relates to a heavy-duty pneumatic radial tire which enables to prevent communication failures to the transponder due to radio wave interference of metallic components while preventing damage to the transponder by specifying arrangement of the transponder.

In recent years, for the purpose of performing manufacturing and shipping management of tires as well as use history management thereof after the tires have been provided to users, studies have been actively pursued on technologies for fixing a transponder with a built-in memory to a tire.

According to many of prior arts, transponders were stuck to the inner surface of tires. However, such a method resulted in not only bad appearance of the inner surface of the tire but also communication failures caused by a longer distance from an interrogator located outside of the tire for communications. It is therefore desired to bury the transponder in a wall portion of the tire.

In such a heavy-duty pneumatic radial tire, however, use of many metallic components caused communication failures to the transponder because of the influence of radio wave interference by the metallic components. Also, large deformation of the tire during the rotation in driving easily caused damage to the transponder. Thus, for burying the transponder in a wall portion of the heavy-duty pneumatic radial tire, sufficient consideration must be given to its installing method

SUMMARY OF THE INVENTION

It is an object of the present invention to provide a heavy-duty pneumatic radial tire which enables to prevent communication failures to a transponder due to radio wave interference of metallic components while preventing damage given to the transponder.

In order to achieve the foregoing object, the heavy-duty pneumatic tire of the present invention comprises a bead filler disposed on an outer periphery of an annular bead core; a carcass layer formed by arraying a plurality of steel cords in a tire radial direction, an end part thereof being turned up from the inside of the tire to the outside around the bead core; a steel reinforcing material wrapping around the bead core with the carcass layer interposed; and a bar-shaped transponder buried in an area separated by 2 to 5 mm from metallic components of a bead section m the bead filler so as to set a longitudinal direction thereof in a tire circumferential direction, the area being closer to the bead core than a turned-up end of the carcass layer in a turned-up side of the carcass layer, and closer to the bead core than an inner wrapping end of the steel reinforcing material in a main body side of the carcass layer.

As described above, the bar-shaped transponder is installed in the bead filler by being arranged in the area separated by a specified distance from the metallic components of the tire bead section and having small deformation during the rotation in driving so as to set the longitudinal direction thereof in the tire circumferential direction. Thus, it is possible to prevent not only communication failures due to radio wave interference of the metallic components but also damage to the transponder.

DETAILED DESCRIPTION OF THE PREFERRED EMBODIMENTS

Figure 1:
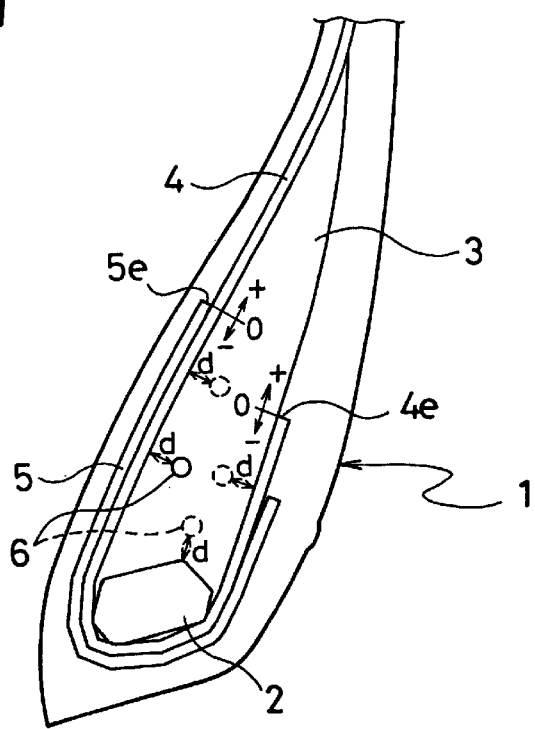
FIG. 1 is a sectional view showing a bead section of a heavy-duty pneumatic radial tire according to an embodiment of the present invention

In FIG. 1, an annular bead core 2 is disposed in a bead section 1. Being made of steel this bead core 2 has, for example, a structure where a steel wire is wound around by plural times. A bead filler 3 made of hard rubber is disposed on the outer periphery of the bead core 2. Hardness of the bead filler rubber should preferably be set in a range of 60 to 85 of JIS-A hardness. With hardness of the bead filler rubber set in tins range, driving stability and ride comfort can be provided simultaneously, and a sufficient protection effect can be secured for a transponder buried in the bead filler 3.

Between a pair of left and right bead sections 1 and 1, a carcass layer 4 is provided, which has a plurality of steel cords arrayed in a tire radial direction. An end part of this carcass layer 4 is turned up from the inside of the tire to the outside around the bead core 2. In the bead section 1, a steel reinforcing material 5 made of a plurality of steel cords is wound around the bead core 2 to envelope the carcass layer 4. A cord angle of the steel reinforcing material 5 relative to a tire circumferential direction is set in a range of 20 to 40°.

Figure 3:
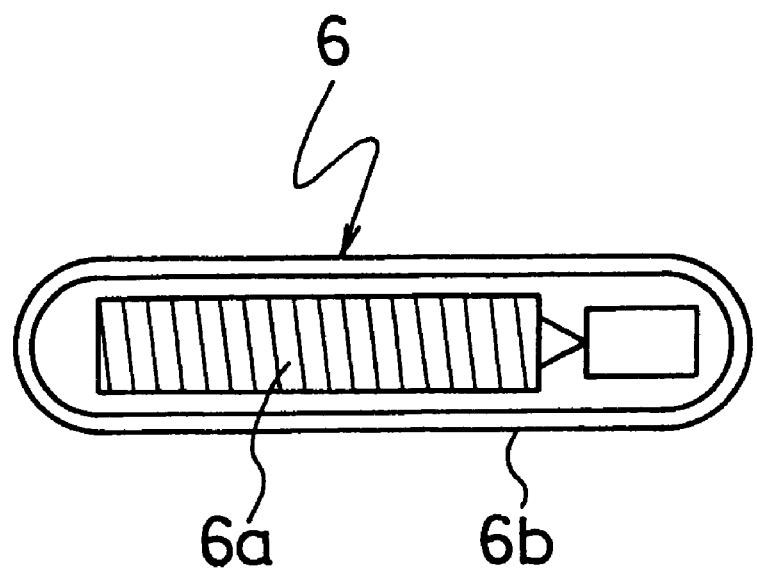
FIG. 3 is a plan view showing a bar-shaped transponder as an example.

In a heavy-duty pneumatic radial tire constructed in the foregoing manner, a bar-shaped transponder 6 is buried in the bead filler 3 such that its longitudinal direction is arranged in the tire circumferential direction. As shown in FIG. 3, the transponder 6 is a glass sealing type, where components 6a including an antenna, a memory a communication circuit and so on, are sealed in a glass tube 6b. Being a passive device, the transponder has no electric energy sources of its own. Instead, the transponder utilizes an inquiry signal emitted from an external energy source as an electric energy source to transmit specified data. For this transponder, one selected from a read-only type, a read/write type and the like can be used: the read-only type prohibiting data in the memory to be rewritten, and the read/write type allowing data in the memory to be read/written.

Figure 2:
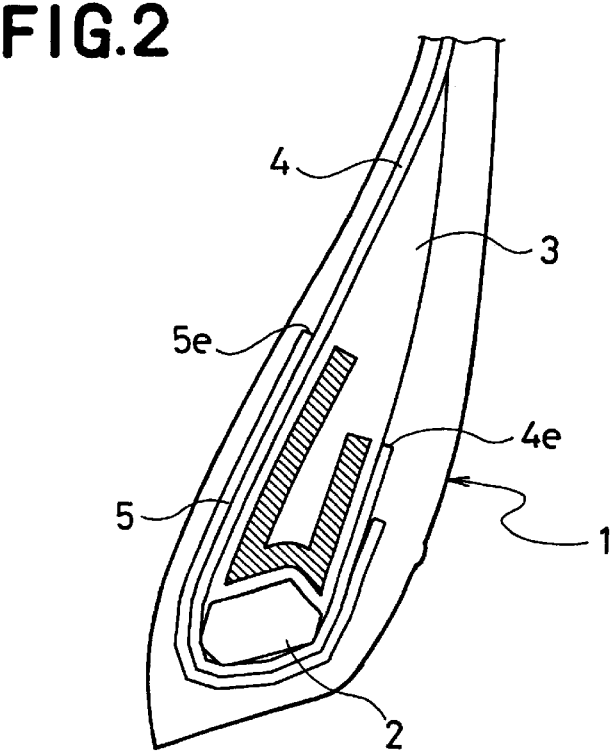
FIG. 2 is a sectional view showing an area for buying a transponder in the bead section of FIG. 1.

As shown in FIG. 2, a position for burying the transponder 6 is optionally selected in an area (hatched part) in the bead filer 3, which is separated by a distance d of 2 to 5 mm from the metallic components (the carcass layer 4 and the bead core 2) of the bead section 1. This area is closer to the bead core 2 than a turned-up end 4e in a turned-up side of the carcass layer 4, and also closer to the bead core 2 than an inner wrapping end 5e of the steel reinforcing material 5 in a main body side of the carcass layer 4.

As described above, the transponder 6 is arranged in the area separated from the metallic components of the bead section 1 by the particular distance d and having smaller deformation during the rotation in driving such that the longitudinal direction thereof is set in the tire circumferential direction. Thus, it is possible to prevent communication failures to the transponder 6 due to radio wave interference of the metallic components while preventing damage given to the transponder 6. If the distance d from the metallic components were less than 2 mm, radio wave interference by the metallic components would easily cause communication failures to the transponder 6. Conversely, if the distance d exceeded 5 mm, the transponder 6 would be disposed in an area having large deformation during the rotation in driving and, thus, damage would easily occur. Also, if the longitudinal direction of the transponder 6 were set in a direction (e.g., in a tire radial direction) different from the tire circumferential direction, the transponder 6 would be easily damaged.

According to the present invention, any one of transponders can be used as long as it is bar-shaped, and no limitation is placed on its internal structure. As the transponder is buried in the rubber, it is necessary to cover the components with a cover material For this cover material glass, plastic or the like can be used Especially, even in the case of using the inexpensive but easily damaged transponder of the glass sealing type, damage due to deformation of the bead filler during the rotation of the tire can be prevented according to the present invention. Thus, the transponder of the glass sealing type buried in the bead section can serve as an information medium for tire management for a long time.

EXAMPLE

With regard to a heavy-duty pneumatic radial tire having a tire size of 11R22.5 and a bead structure shown in FIG. 1, tires of embodiments 1 to 4 and comparison examples 1 and 2 were manufactured in the manner that glass sealing type transponders were buried in bead fillers so as to set the longitudinal directions thereof in tire circumferential directions, and distances d from the metallic components of bead sections were different from one another.

For these test tires, occurrence rates of failed communications at a brand new stage and occurrence rates of damage after driving were measured by the following testing method The results are shown in Table 1.

Occurrence rate of failed communications at a brand new stage:

When each test tire was a brand new product, communications were tried with the transponder in the bead section by using a transponder scanner. Then, an occurrence rate (%) of failed communications was calculated Occurrence rate of damage after driving:

Each test tire was fitted to a truck. After driving of 100,000 km with an air pressure of 800 kPa, the transponder was removed from the bead section, and an occurrence rate (%) of damage was calculated.

TABLE 1

| | d(mm) | Occurrence rate (%) of failed communication at brand new stage | Occurrence rate (%) of damage after driving |
| --- | --- | --- | --- |
| Comparison example 1 | 1.5 | 90 | 0 |
| Embodiment 1 | 2.0 | 0 | 0 |
| Embodiment 2 | 3.0 | 0 | 0 |
| Embodiment 3 | 4.0 | 0 | 0 |
| Embodiment 4 | 5.0 | 0 | 0 |
| Comparison example 2 | 5.5 | 0 | 40 |

As can be understood from Table 1, no communication failures or damage occurred in the transponders of the tires of the embodiments 1 to 4 . On the other hand, in the case of the tire of the comparison example 1, as the distance d from the metallic components was too small the occurrence rate of failed communications in the transponder was high.

In the case of the tire of the comparison example 2, as the distance d from the metallic components was too large, the occurrence rate of damage in the transponder was high Then, with regard to the same heavy-duty pneumatic radial tire as that described above, tires of embodiments 5 to 7 and comparison examples 3 and 4 were manufactured in the manner that lass sealing type transponders were buried along the main body sides of carcass layers in bead fillers so as to set the longitudinal directions thereof in tire circumferential directions, distances d from metallic components of bead sections were all set to 5.0 mm, and positions of the transponders in tire radial directions were different from one another. Herein, the position of the transponder in the tire radial direction is indicated by a distance from an inner wrapping end of the steel reinforcing material. A plus value means a position outer in the tire radial direction from the inner wrapping end, while a minus value means a position closer to the bead core than the inner wrapping end.

For these test tires, occurrence rates of damage after driving were measured by employing the foregoing testing method. The results are shown in Table 2.

TABLE 2

| | Position of transponder in tire radial direction | Occurrence rate (%) of damage after driving |
| --- | --- | --- |
| Embodiment 5 | Inner wrapping end −10 mm | 0 |
| Embodiment 6 | Inner wrapping end −5 mm | 0 |
| Embodiment 7 | Inner wrapping end ±0 mm | 0 |
| Comparison example 3 | Inner wrapping end +5 mm | 30 |
| Comparison example 4 | Inner wrapping end +10 mm | 70 |

As can be understood from Table 2, no damage occurred in the transponders of the tires of the embodiments 5 to 7. On the other hand, in the case of the tires of the comparison examples 3 and 4, as the transponders were disposed in the positions outer in the tire radial directions from the inner wrapping ends of the steel reinforcing materials, occurrence rates of damage thereof were high.

Then, with regard to the same heavy-duty pneumatic radial tire as that described above, tiers of embodiments 8 to 10 and comparison examples 5 and 6 were manufactured in the manner that glass sealing type transponders were buried along the turned-up sides of carcass layers in bead filler so as to set the longitudinal directions thereof in tire circumerential directions, distances d from the metallic components of bead sections were all set to 5.0 mm, and positions of the transponders in tire radial directions were different from one another. Herein, the position of the transponder in the tire radial direction is indicated by a distance from the turned-up end of the carcass layer. A plus value means a position outer in the tire radial direction from the turned-up end, while a minus value means a position closer to a bead core than the turned-up end.

For these tires, occurrence rates of damage after driving were measured by employing the foregoing testing method. The results are shown in Table 3.

TABLE 3

| | Position of transponder in tire radial direction | Occurrence rate (%) of damage after driving |
| --- | --- | --- |
| Embodiment 8 | Turned-up end −10 mm | 0 |
| Embodiment 9 | Turned-up end −5 mm | 0 |

TABLE 3-continued

| | Position of transponder in tire radial direction | Occurrence rate (%) of damage after driving |
|---|---|---|
| Embodiment 10 | Turned-up end ±0 mm | 0 |
| Comparison example 5 | Turned-up end +5 mm | 30 |
| Comparison example 6 | Turned-up end +10 mm | 60 |

As can be understood from Table 3, no damage occurred in the transponders of the tires of the embodiments 8 to 10. On the other hand, in the case of the tires of the comparison examples 5 and 6, as the transponders were disposed in the positions outer in the tire radial directions from the turned-up ends of the carcass layers, occurrence rates of damage thereof were high.

What is claimed is:

1. A heavy-duty pneumatic radial tire comprising:
   a bead filler disposed on an outer periphery of an annular bead core;
   a carcass layer formed by arraying a plurality of steel cords in a tire radial direction, an end part of the carcass layer being turned up from the inside of the tire to the outside around said bead core;
   a steel reinforcing material wrapping around said bead core with said carcass layer interposed; and
   a bar-shaped transponder buried in an area separated by 2 to 5 mm from metallic components of a bead section in said bead filer so as to set a longitudinal direction thereof in a tire circumferential direction, said area being closer to the bead core than a turned-up end of the carcass layer in a turned-up side of said carcass layer, and closer to the bead core than an inner wrapping end of said steel reinforcing material in a main body side of said carcass layer.

2. A heavy-duty pneumatic radial tire according to claim 1, wherein said bead filler is made of rubber and hardness of rubber of said bead filler is set in a range of 60 to 85 of JIS-A hardness.

3. A heavy-duty pneumatic radial tire according to claim 1, wherein said transponder is a glass sealing type transponder having components including an antenna, a memory and a communication circuit sealed in a glass tube.

4. A heavy-duty pneumatic radial tire according to claim 3, wherein said bead filler is made of rubber and hardness of rubber of said bead filler is set in a range of 60 to 85 of JIS-A hardness.

* * * * *